United States Patent [19]
Tsunekawa et al.

[11] 3,864,699
[45] Feb. 4, 1975

[54] AUTOMATIC EXPOSURE CONTROL SYSTEM FOR TTL METERING TYPE SINGLE-LENS REFLEX CAMERA

[75] Inventors: Tokuichi Tsunekawa, Yokohama; Soichi Nakamoto, Goro Hasegawa, both of Japan

[73] Assignee: Canon Kabushiki Kaisha, Tokyo, Japan

[22] Filed: Sept. 6, 1973

[21] Appl. No.: 394,750

[30] Foreign Application Priority Data
Sept. 11, 1972 Japan.............................. 47-91090

[52] U.S. Cl........................ 354/31, 354/51, 354/56
[51] Int. Cl. ............................................. G03b 7/08
[58] Field of Search.......................... 354/31, 56, 51

[56] References Cited
UNITED STATES PATENTS

| | | |
|---|---|---|
| 3,519,361 | 7/1970 | Hidaka et al. ..................... 354/31 X |
| 3,561,855 | 2/1971 | Mayr et al. ........................ 354/31 X |
| 3,687,026 | 8/1972 | Kobayashi et al. ................... 354/51 |
| 3,690,241 | 9/1972 | Nomura............................... 354/31 |

Primary Examiner—Richard A. Wintercorn
Attorney, Agent, or Firm—Flynn & Frishauf

[57] ABSTRACT

In the TTL metering type single-lens reflex camera, a photoelectric converter element disposed for receiving light from a viewfinder's optical system and a photoelectric converter element disposed outwardly of such optical system for receiving light reflected from a shutter curtain or a film surface after flip-up of the viewing mirror are parallel-connected and have characteristics selected to be substantially equal so that the rising and falling electrical properties of these elements are utilized to accomplish a smooth transition of exposure control.

3 Claims, 4 Drawing Figures

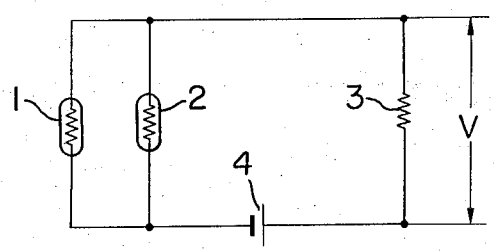
FIG. 1
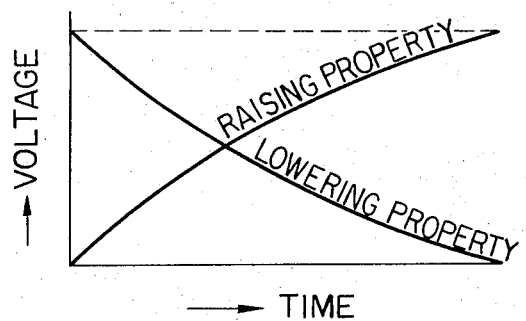
FIG. 2
FIG. 3
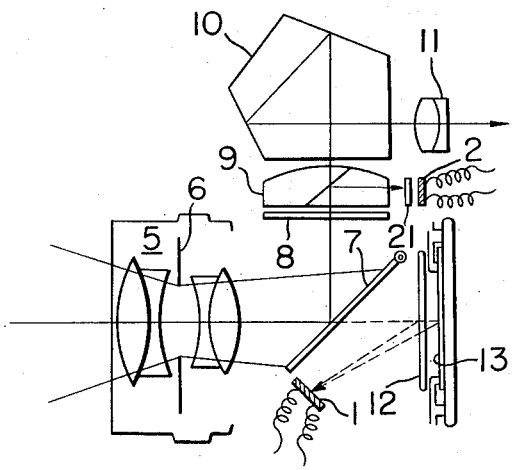
FIG. 4
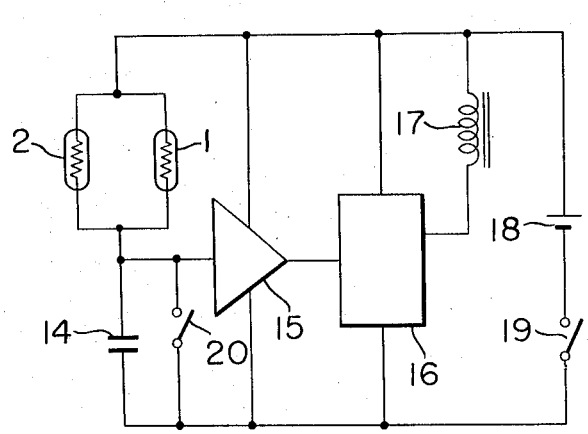

AUTOMATIC EXPOSURE CONTROL SYSTEM FOR TTL METERING TYPE SINGLE-LENS REFLEX CAMERA

BACKGROUND OF THE INVENTION

1. Field of the Invention

This invention relates to an automatic exposure control system for the TTL metering type of single-lens reflex camera.

2. Description of the Prior Art

In the conventional single-lens reflex camera of the described type, a photoelectric converter element has been disposed at a position for receiving light from a viewfinder's optical system to effect automatic exposure control. This has required some memory means to be provided because the light to the photoelectric converter element is interrupted when the viewing mirror flips up immediately before picture-taking. Such memory means is not required photoelectric converter element is located at a position for receiving light reflected from the film surface or the shutter curtain after flip-up of the mirror, but in this case the picture-taking information cannot be obtained in advance of the picture-taking operation and the response characteristic of the photoelectric converter element in use forms a critical problem.

SUMMARY OF THE INVENTION

It is an object of the present invention to overcome the above-noted disadvantages.

It is another object of the present invention to eliminate such memory means as has heretofore been employed.

It is still another object of the present invention to sufficiently accommodate, through the real-time metering, any variation which may arise between the quantity of light before picture-taking and that during picture-taking, thereby ensuring accurate automatic exposure control.

The invention will become fully apparent from the following detailed description of an embodiment thereof taken in conjunction with the accompanying drawings.

BRIEF DESCRIPTION OF THE DRAWINGS

FIG. 1 is a circuit diagram illustrating the principle of the present invention.

FIG. 2 is a graph illustrating the characteristics of the photoelectric converter elements shown in FIG. 1.

FIG. 3 schematically shows the construction of a TTL metering type single-lens reflex camera which incorporates the photoelectric converter elements shown in FIG. 1.

FIG. 4 is a diagram of the shutter speed control circuit in the camera of FIG. 3 in the circuit arrangement of FIG. 1.

DESCRIPTION OF THE PREFERRED EMBODIMENTS

The principle of the present invention will first be described by reference to FIGS. 1 and 2. Reference numerals 1 and 2 designate two photoelectric converter elements such as CdS photoconductive or the like which are equal in input-output characterictic (relationship between quantity of incident light and output resistance) and in response characterictic (rise and fall properties of the response), and which are parallel-connected together. Numerals 3 and 4 designate a load resistance and a battery, respectively.

The design is made such that when a predetermined quantity of light is being passed to the photoconductive element 1 the light to the other element 2 is being blocked and that as soon as the light to the element 1 is interrupted a predetermined quantity of light is passed to the element 2. Thus, when the load resistance 3 is sufficiently lower than the resistances of the photoconductive elements 1 and 2, a voltage V produced across the load resistance 3 will be the sum of the voltages represented by the rising and falling properties of response shown in FIG. 2, and if these properties are substantially equal to each other, the output voltage V will be substantially constant. This shows that the combined resistance of the two photoconductive elements 1 and 2 is variable substantially at a constant level for any variation in quantity of incident light. In other words, it has been found that common types of photoconductive elements that have the same rise and fall characteristics will have rise and fall characteristics that are complementary in the arrangement described.

The present invention utilizes thus principle for the purpose of automatic exposure control. Referring now to FIG. 3 there is schematically shown a single-lens reflex camera which includes a lens system 5, a diaphragm 6, a quick-return mirror 7, a focusing screen 8, a condenser lens 9 having a beam splitting function, a pentaprism 10, an eye-piece 11, a shutter curtain 12 and a film 13.

The photoconductive elements 1 and 2, whose characteristics have been described with respect to FIGS. 1 and 2, are respectively located at a position below the mirror 7 for receiving the light reflected from the film surface or the shutter curtain and at a position for receiving the light after passing through the condenser lens 9. A light regulating member 21, which is for example, a ND filter or stop is adapted to releaseably inserted in front of the photoconductive element 2. Where the camera is of the open-aperture photometering type, and during stop preset operation, the light regulating member 21 is inserted in front of the photoconductive element 2 in response to the movement of a stop ring so as to equalize the quantity of light impinging on the photoconductive element 2 before exposure to the quantity of the light impinging on the photoconductive element 1 during exposure. During the stopped-down metering, the light regulating member 21 may likewise be disposed in front of the photoconductive element 2 so as to equalize the quantity of light during the stop-down to the quantity of light reflected from the film surface or the shutter curtain.

FIG. 4 illustrates an example of the electric circuit using the photoconductive elements 1 and 2. The circuit includes a shutter speed control capacitor 14, an amplifier system 15, a trigger circuit 16, a magnet 17 for an electromagnetic shutter, an electrical power source 18, a power switch 19 and a start switch 20 responsive to movement of the forward shutter curtain.

During picture-taking, at first the light passed through the lens system 5 will be reflected upwardly by the mirror 7, while the mirror 7 is in its lower position as shown in FIG. 3, and the light so reflected will partly be reflected again by the condenser lens 9 to impinge on the photoconductive element 2. Depression of a shutter button will close the power switch 19 to raise the mirror 7 and move the shutter curtain (forward curtain) 12. Simultaneously therewith, the light to the photoconductive element 2 will be interrupted while the reflected light from the shutter curtain or from the film surface will impinge on the photoconductive element 1, thereby opening a switch 20 to charge the capacitor 14. When the charging potential attains a trigger level, the magnet 17 will be energized to move the shutter curtain (rear curtain) 12, thus completing an exposure.

Thus, according to the present invention, the photoelectric converter elements 1 and 2 of substantially equal rising and falling electric response properties are parallel-connected together so that supply and interruption of light to those elements 1 and 2 may be changed over smoothly from one to the other after the flip-up of the mirror 7, thus ensuring that the combined resistance of the two photoelectric elements 1 and 2 be varied substantially at a predetermined level in accordance with the variation in the quantity of incident light and such combined resistance be constant before and after the jump-up of the mirror 7.

The result is:

a. The memory means heretofore required can be eliminated; and b. Because of the real-time metering, any variation which may arise between the quantity of light before picturetaking and that during picture-taking can be sufficiently accommodated to ensure accurate automatic exposure control.

Further, by providing an information indicator mechanism such as luminous diode or meter adjacent the focusing screen 8 or the like, and by designing it so as to be operable in response to a first-stage depression of the shutter button, it is possible to have picture-taking information such as shutter speed indicated in advance of an actual picture-taking operation. Also, automatic exposure control may likewise be accomplished by the utilization of output current from photoelectromotive type elements such as silicon blue cells or the like.

Although the foregoing embodiment has been described with respect to the shutter speed control, the present invention is also applicable for the stop control or the flashlight control. It is also feasible to incorporate an indicator system in the circuit of FIG. 4 to thereby accomplish indication of the exposure.

We claim:

1. An automatic exposure control system for a through-the-lens photometry type single-lens reflex camera comprising:

a finder optical system having a movable mirror;

a first photoelectric converter element having a surface for receiving a light flux passing through said finder optical system;

a second photoelectric converter element disposed outside of the light path of said finder optical system and having a surface for receiving a light flux reflected by at least one of a shutter curtain and a film surface, the electrical response properties of the second photoelectric converter element being selected to be substantially the same as those of the first photoelectric converter element and those two elements being connected in parallel with each other; and means for controlling the exposure including said parallel-connected first and second photoelectric converter elements and controlling the exposure by simultaneously utilizing the response rise property of said first photoelectric converter element and the response fall-off characteristic of said second photoelectric converter characteristic during transfer of exposure control from one of said converter elements to the other.

2. An automatic exposure control system for a through-the-lens photometry type single-lens reflex camera according to claim 1, in which said surface of the second photoelectric converter element receives light flux reflected from a film surface at the time of the shutter opening.

3. An automatic exposure control system for a through-the-lens photometry type single-lens reflex camera according to claim 2, in which a light quantity controlling element is disposed in front of said light receiving surface of the first photoelectric converter element.

* * * * *